United States Patent

[11] 3,601,451

[72] Inventors Curtis F. Cummins
Decatur;
Kenneth W. Kelly, Latham; Larry G. Warren, Peoria, all of, Ill.
[21] Appl. No. 824,937
[22] Filed May 15, 1969
[45] Patented Aug. 24, 1971
[73] Assignee Caterpillar Tractor Co.
Peoria, Ill.

[54] EMERGENCY BRAKE CONTROL SYSTEM
6 Claims, 2 Drawing Figs.
[52] U.S. Cl. ................................................. 303/13, 303/2, 303/9
[51] Int. Cl. .................................................. B60t 13/28
[50] Field of Search ........................................ 303/13, 2, 9.7

[56] References Cited
UNITED STATES PATENTS

| | | | |
|---|---|---|---|
| 3,228,729 | 1/1966 | Schubert ..................... | 303/9 |
| 3,237,995 | 3/1966 | Dobrikin ..................... | 303/13 X |
| 3,273,950 | 9/1966 | Vielmo ........................ | 303/9 |
| 3,294,455 | 12/1966 | Valentine .................... | 303/9 |
| 3,443,839 | 5/1969 | Hinrichs et al. ............. | 303/13 X |

Primary Examiner—Milton Buchler
Assistant Examiner—John J. McLaughlin
Attorneys—Fryer, Tjensvold, Feix, Phillips & Lempio ABSTRACT: A fluid pressure emergency brake control system has a novel valving arrangement which permits the operator of a vehicle to apply and release the brakes so long as the fluid pressure in the system is above a predetermined level and after the fluid pressure drops below the predetermined level only allows the operator to apply the brakes.

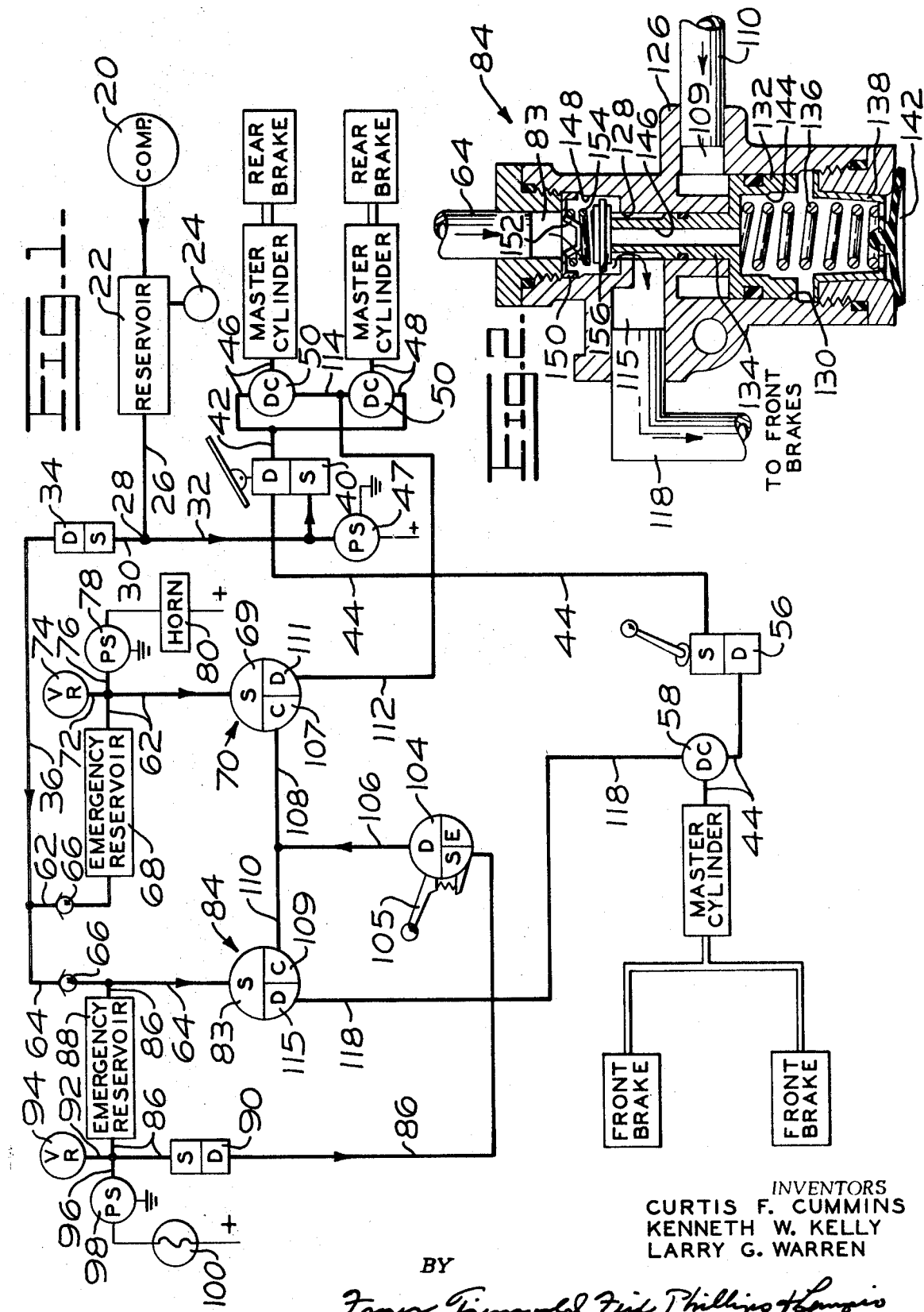

EMERGENCY BRAKE CONTROL SYSTEM

BACKGROUND OF THE INVENTION

This invention relates to an emergency brake control system for highway vehicles such as large trucks and the like. More particularly the invention is directed to an emergency brake control system which will allow the operator of the vehicle a greater degree of control over brake application and release during an emergency situation than has heretofore been possible with conventional emergency brake systems.

One of the primary drawbacks of present day emergency brake systems is the lack of operator control over brake application in an emergency situation. In many emergency brake systems the operator is suddenly warned that a failure has occurred in the main brake system and that the vehicle can only be stopped by operating the emergency brakes. In these prior art systems the operator has little control over the application of the brakes during an emergency. That is, the operator can only decide "when" to apply the emergency brakes. One the brakes are applied through the emergency system the operator cannot release the brakes. This can lead to serious consequences due to skidding and loss of control of the vehicle. Such a single application emergency brake system can be especially dangerous on wet or icy pavement where a sudden locking of the brakes can easily cause the operator to lose control of the vehicle.

The principal object of the present invention is the provision of an emergency brake control system which will allow the operator to selectively apply and release the brakes a plurality of times in order to safely bring the vehicle to a controlled stop.

A further object of the invention is the provision of an adequate warning system which will firstly alert the operator of a failure in the main brake system and secondly alert the operator after several brake applications through the emergency system that it will not be possible to release the brakes after the next application thereof.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is an overall schematic view illustrating the major components of both the standard brake system and an emergency brake control system for a vehicle; and, FIG. 2 is a cross-sectional view illustrating the structural details of a preferred form of inversion valve which may be used in the emergency brake control system of the present invention.

DESCRIPTION OF THE PREFERRED EMBODIMENT

Referring now to FIG. 1, a conventional air compressor 20 supplies air under pressure to a main air pressure reservoir 22. The main air pressure reservoir 22 is provided with a safety valve 24 which prohibits a buildup of air pressure in the main reservoir in excess of 150 p.s.i.

A conduit 26 leads from the main reservoir 22 to a junction connection 28. During normal operation air under pressure is supplied from the reservoir 22 through the foot-operated 26 and junction 28 to a conduit 30 and a conduit 32.

A pressure protection valve 34 is located in the conduit 30. The pressure protection valve 34 is normally open to supply air pressure to a conduit 36 which leads to an emergency brake control system which will be described in greater detail at a later point in the description. However, at this point it should be noted that the pressure protection valve 34 closes off supply of air pressure to the conduit 36 whenever the delivery pressure in conduit 26 falls below a predetermined value, for example, 60 p.s.i.

Under normal operating conditions air pressure will be supplied to the main brake system of the vehicle by way of the conduit 32. Conduit 32 leads to a foot-operated brake valve 40. The foot-operated brake valve 40 is operable to deliver air pressure to a conduit 42 and a conduit 44.

The conduit 42 communicates with branch conduits 46 and 48 which in turn communicate with the rear brake master cylinders via double-check valves shown at 50. The double check valves 50 are conventional shuttle-type valves which allow two separate supply sources to be combined to one delivery port. The double-check valves also block open or unused conduits.

The conduit 44 communicates air pressure from the foot operated brake valve 40 to a normally open hand-operated front wheel brake cutout valve 56 and then to a double-check valve 58 which in turn communicates with the master cylinder for the front brakes of the vehicle.

During normal operation of the main brake system depression of the foot-operated brake 40 warning both the rear and front brakes to a degree proportional to the amount of depression of the brake valve 40. During certain operations of the vehicle it may be desirable to apply only the rear brakes and during these instances the hand-operated front wheel brake cutout valve 56 is moved to a closed position thereby preventing air pressure from passing through the downstream side of the conduit 44 to the master cylinder for the front brakes. It should also be noted that the supply port of the brake valve 40 communicates with a pressure switch 47 which actuates a warning light and buzzer assembly (not shown) in the vehicle cab when the air pressure in conduit 32 drops below a predetermined value, for example 60 p.s.i.

Returning now to the emergency brake control system it will be recalled that air pressure from the reservoir 22 communicates through the conduit 26 to the conduit 30 through the normally open pressure protection valve 34 which delivers air pressure to a conduit 36. The conduit 36 branches into conduits 62 and 64.

The conduit 62 communicates air pressure through a check valve 66 to a rear brake emergency reservoir 68. The purpose of the check valve 66 is to maintain a certain predetermined pressure in the emergency reservoir 68. For example, the check valve 66 could be set to close at any time the pressure in the conduit 36 drops below a given value which might be 120 p.s.i.

The conduit 62 leads from the emergency reservoir 68 to a supply port 69 of an inversion valve 70. A branch conduit 72 communicates the conduit 62 with a safety relief valve 74 which exhausts air pressure from the reservoir 68 when the pressure in the reservoir exceeds a predetermined value, for example 150 p.s.i. Another branch conduit 76 communicates the conduit 62 with a pressure switch 78. The pressure switch 78 is set to actuate a horn 80 when the pressure in the emergency system descends below a predetermined value.

The branch conduit 64 also leads through a check valve 66 and communicates with a supply port 83 of an inversion valve 84. A branch conduit 86 leads from conduit 64 and communicates a front brake emergency reservoir with a normally open pressure protection valve 90 which may be set to close when the pressure in conduit 86 drops below a predetermined value, for example 60 p.s.i.

A branch conduit 92 communicates the conduit 86 with a safety relief valve 94 which functions like the valve 74 to exhaust air pressure from the reservoir 88 when the pressure in the reservoir 88 exceeds a predetermined value, 150 p.s.i. Another branch conduit 96 communicates the conduit 86 with a pressure switch 98. The pressure switch 98 is similar to the pressure switch 78 and is set to actuate a warning light 100 when the pressure in the emergency system descends below a predetermined value.

The conduit 86 leads from the normally open pressure protection valve 90 to a supply port of normally open hand-operated emergency control valve 104. The normally open emergency control valve 104 delivers air pressure to a conduit 106. The conduit 106 communicates with a conduit 108 which delivers air pressure to a control port 107 of the inversion valve 70. Conduit 106 also communicates with a conduit 110 which delivers air pressure to a control port 109 of the inversion valve 84.

The inversion valve 70 is provided with a delivery port 111 which can supply air pressure to a conduit 112 during an emergency situation. The conduit 112 communicates with a branch conduit 114 which communicates air pressure to the rear brakes via double-check valves 50 during an emergency situation.

Similarly, the inversion valve 84 is provided with a delivery port 115 which supplies air pressure to a conduit 118 during an emergency situation. The conduit 118 communicates air pressure to the front brakes via double check valve 58 during an emergency.

Referring now to FIG. 2 the details of the construction of the inversion valves 70 and 84 will be explained. The description will be directed to inversion valve 84, it being understood that the valve 70 has identical components.

The inversion valve 84 comprises a main housing 126 which is provided with a central bore 128. The bore 128 has an enlarged diameter portion 130 which receives the enlarged end 132 of a movable valve spool 134. A coil spring 136 is retained in the lower end of the enlarged bore 130 by means of a conventional spring retainer assembly 138.

The spring retainer 138 has holes or slots formed in its lower end. If sufficient air pressure builds up in the enlarged bore 130 a flexible rubber diaphragm member 142 will allow air to be exhausted from the enlarged bore. The upper end of the coil spring 136 is received in a recessed portion 144 of the valve spool 134.

It should be noted that the rod portion of the spool 134 is provided with a hollow bore 146. At the upper end 148 of the housing bore 128 a spring retainer 150 having a central orifice 152 retains a small coil spring 154. The lower end of the coil spring 154 is provided with a washer seal 156 which is normally biased downwardly.

Under normal circumstances (that is, in a nonemergency situation) air pressure at approximately 120 p.s.i. will be communicated through the conduit 64 to the supply port 83 of the inversion valve 84. This air pressure in conduit 64 will either be transmitted from the emergency reservoir 88 via the conduit 86 or if the check valve 66 is open then the air pressure in the conduit 64 will be transmitted from the main brake circuit via the conduit 26 which is in communication with the main reservoir 22.

In addition, air pressure at 120 p.s.i. will be transmitted from the emergency reservoir 88 to the conduit 86 through the normally open pressure protection valve 90 and on to the supply and delivery ports of the normally open emergency control valve 104. Emergency control valve 104 transmits this air pressure to conduit 106 and finally to the conduit 110 which is in communication with the control port 109 of the inversion valve 84.

The control port 109 communicates air pressure from the conduit 110 to the upper surface of the enlarged end 132 of the valve spool 134. At any time when the air pressure in the control port 109 descends to approximately 45 p.s.i. the coil spring 136 will actuate the spool 134 upwardly to the position shown in FIG. 2. That is, the spool will move upwardly so that the upper end of the spool 134 engages the washer seal 156 thereby closing off the internal bore 146 of the spool and simultaneously moving the washer seal upwardly to permit air pressure to be transmitted from the supply port 83 to the delivery port 115. During this condition of the inversion valve 84, air pressure from the emergency reservoir 88 is transmitted to the conduit 64, supply port 83, delivery port 115 and conduit 118 to apply the front brakes as shown in FIG. 1.

If the pressure at the control port 109 ascends to approximately 65 p.s.i. the air pressure on the enlarged end 132 of the spool 134 overcomes the bias of coil spring 136 and the spool is moved downwardly in the enlarged bore 130. At this time the washer seal 156 is biased by the spring 154 to close off the supply port 83 from the delivery port 115. When the spool 134 is moved to this lower position under the influence of the pressure at the control port 109, the supply port 115 exhausts air pressure from the brake delivery conduit 118 via the internal bore 146 of the spool and the flexible diaphragm 142.

The overall operation of the emergency brake control system is as follows. At any time the pressure in the main brake system drops below approximately 60 p.s.i. the pressure protection valve 34 will close and the pressure switch 47 will actuate a warning light and buzzer assembly in the cab of the vehicle thereby warning the operator that only 60 p.s.i. are available in the main brake system. Prior to this time the check valves 66 move to a closed position to insure that at least 120 p.s.i. are maintained in the emergency reservoirs 68 and 88 of the emergency brake control system.

The operator of the vehicle may now move a lever 105 on the normally open emergency control valve 104 to close the valve which blocks off the conduit 86 and opens the conduit 106 to the exhaust port of the valve 104. Exhausting air from the conduit 106 results in an immediate drop in the air pressure at the control ports 107 and 109 of the inversion valves 69 and 84. Once the pressure at the control ports 107 and 109 drops below 45 p.s.i., 120 p.s.i. is communicated from the emergency reservoir through the conduits 62 and 64 to the supply ports 69 and 83 then to the delivery ports 111 and 115, and finally to the front and rear brakes via the conduits 118 and 112.

The operator may disengage the brakes by releasing the spring biased lever 105 of the emergency control valve 104 which automatically opens the supply port of the emergency control valve to the pressure in conduit 86 which pressure is transmitted trough the conduit 106 to the control ports 107 and 109 of the inversion valves 70 and 84. So long as the pressure at the control ports 107 and 109 exceeds 65 p.s.i. the inversion valves will function to block delivery from the supply ports 69 and 83 to the brake delivery ports 111 and 115.

Thus, the operator of the vehicle will have an opportunity to apply and release the front and rear brakes via the emergency control system several times depending upon the capacity of the emergency reservoirs 68 and 88. However, once the pressure in the emergency reservoirs drops below 60 p.s.i. the pressure switches 78 and 98 will actuate the horn 80 and warning light 100 indicating to the operator that he will not be able to release the brakes if they are applied again. At this time the normally open pressure protection valve 90 will also move to a closed position since the pressure in the conduit 86 has dropped below 60 p.s.i. Stated otherwise, after several applications of the emergency brakes via the emergency control system the pressure in the emergency control system will drop to a danger point whereby the operator will no longer be able to release the brakes if he applies them.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

1. An emergency brake control system for selectively applying and releasing the pressure actuated brakes of a vehicle when failure occurs in a primary brake control system comprising;
    emergency reservoir means having pressure fluid normally maintained at a first predetermined pressure independent of the pressure level of the primary brake control system;
    conduit means for selectively communicating pressure fluid from the emergency reservoir means to the pressure-actuated brakes to apply said brakes; and emergency control means in fluid communication with the conduit means and including a manually operable emergency control valve which permits an operator of the vehicle to selectively apply and release the brakes when the emergency reservoir pressure is above a second predetermined pressure which is lower than the first predetermined pressure, and after the emergency reservoir pressure drops below the second predetermined pressure only permitting the operator to apply the brakes.

2. A fluid-actuated emergency brake control system for selectively applying and releasing the pressure actuated brakes of a vehicle when fluid pressure in a primary brake control system drops below a predetermined level comprising:

emergency reservoir means;

first conduit means for normally communicating pressure fluid to the emergency reservoir means from a fluid pressure source which source also supplies pressure fluid to the primary brake control system;

First valve means for maintaining a first predetermined pressure in the emergency reservoir means independent of the pressure in the primary brake control system;

second conduit means for selectively communicating pressure fluid from the emergency reservoir means to said pressure-actuated brakes to apply said brakes; and, emergency control means in fluid communication with the second conduit means and including a manually operable emergency control valve which permits an operator of the vehicle to selectively apply and release the brakes when the emergency reservoir pressure is above a second predetermined pressure which is lower than the first predetermined pressure, and after the emergency reservoir pressure drops below the second predetermined pressure only permitting the operator to apply the brakes.

3. A fluid-actuated emergency brake control system for selectively applying the pressure actuated brakes of a vehicle when fluid pressure in a primary brake control system drops below a predetermined level comprising:

a source of pressure fluid;

emergency reservoir means;

first conduit means for normally communicating pressure fluid to the emergency reservoir means from the fluid pressure source;

first valve means for maintaining a first predetermined pressure in the emergency reservoir means independent of the pressure at the fluid pressure source;

inversion valve means having a supply port, a control port, and a delivery port;

second conduit means communicating fluid pressure from the emergency reservoir to the supply port of the inversion valve;

a manually operable emergency control valve having a supply port, delivery port, and exhaust port;

third conduit means communicating the emergency reservoir with the supply port of the emergency control valve;

fourth conduit means communicating the delivery port of the emergency control valve with the control port of the inversion valve;

fifth conduit means communicating the delivery port of the inversion valve with the pressure-actuated brakes of the vehicle;

said emergency control valve operable to permit an operator of the vehicle to selectively exhaust pressure fluid from the fourth conduit means;

said emergency control valve having a normally open condition to transmit emergency reservoir pressure through the fourth conduit to the control port of the inversion valve;

the inversion valve having a normal operating condition wherein so long as the pressure in the fourth conduit is above a second predetermined pressure, the delivery port of the inversion valve will not communicate pressure fluid from the emergency reservoir to the brakes;

said inversion valve having a second operating condition such that if the pressure in the fourth conduit drops below the second predetermined pressure the delivery port of the inversion valve will supply emergency reservoir pressure to the brakes through the fifth conduit to apply said brakes.

4. An emergency brake control system as set forth in claim 3 wherein indicator means are provided in the cab of the vehicle to alert the operator of the vehicle when the pressure in the primary brake control system has dropped below a predetermined level.

5. An emergency brake control system as set forth in claim 4 wherein second indicator means are located in the cab of the vehicle to alert the operator when the pressure in the emergency reservoir has dropped below the second predetermined pressure.

6. An emergency brake control system as et forth in claim 3 wherein indicator means are located in the cab of the vehicle to alert the operator when the pressure in the emergency reservoir has dropped below the second predetermined pressure.